Oct. 13, 1959 S. WEINREICH ET AL 2,908,087
CAR CONTROL DEMONSTRATOR
Filed Dec. 9, 1955 4 Sheets-Sheet 1
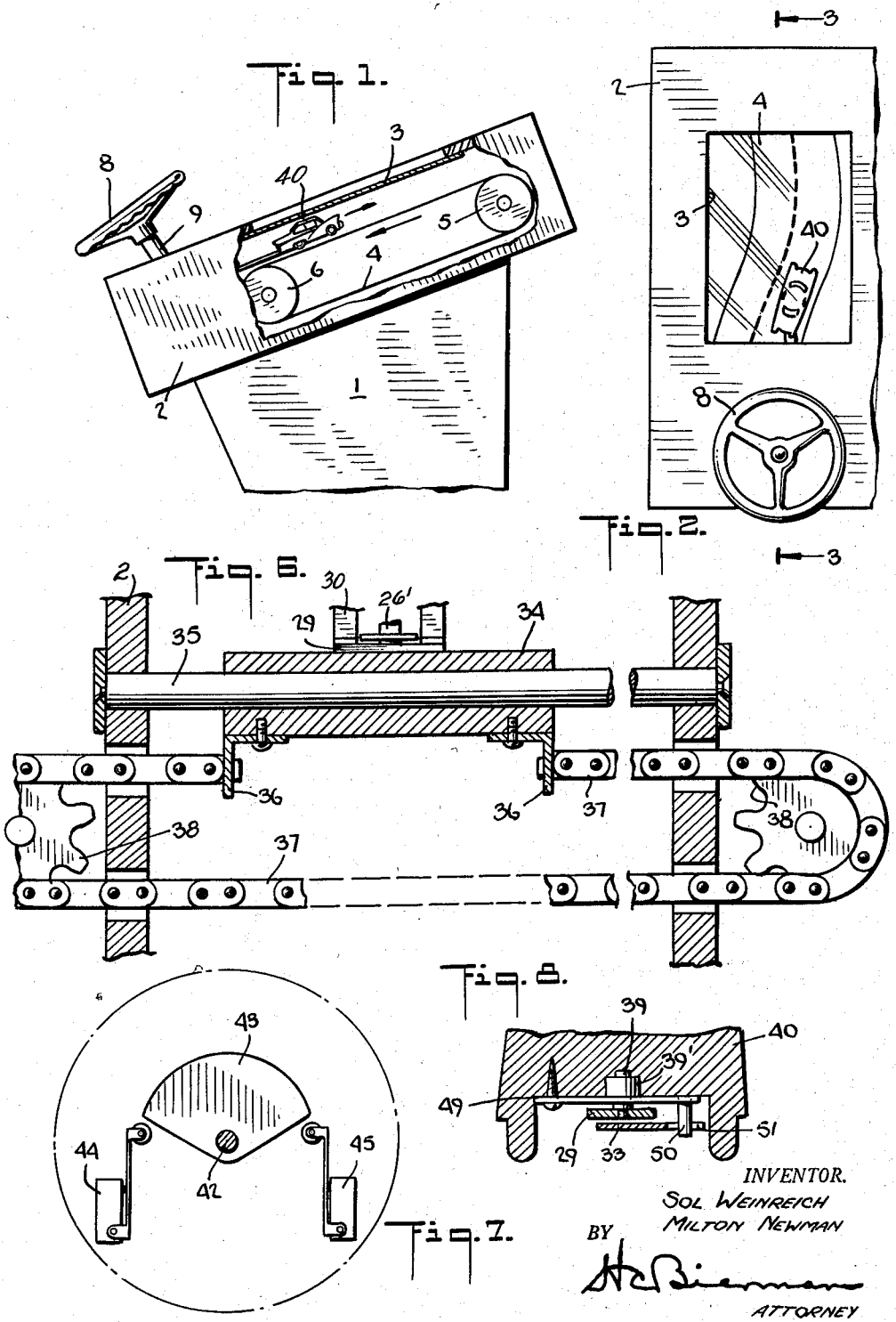
INVENTOR.
SOL WEINREICH
MILTON NEWMAN
BY
ATTORNEY

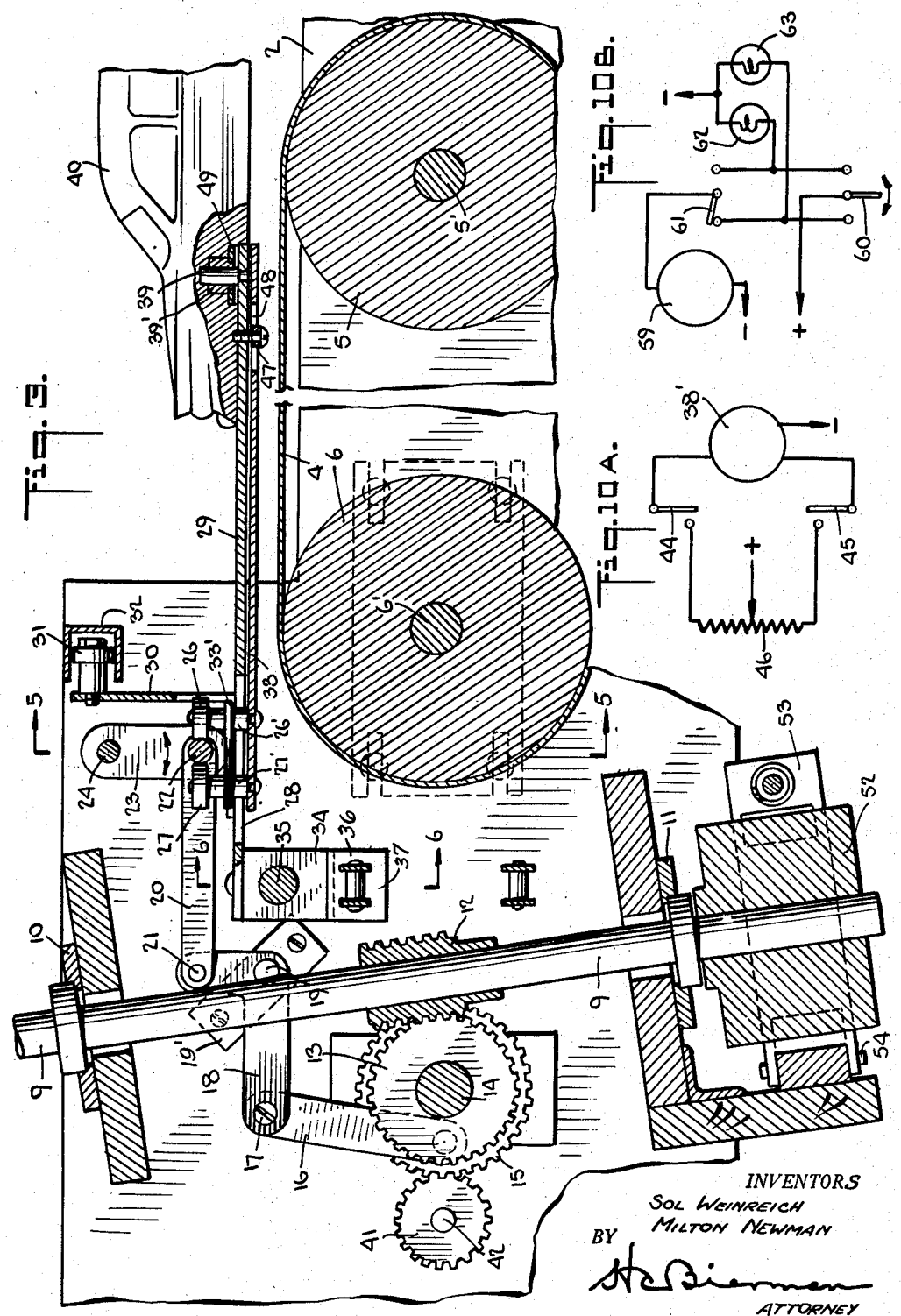

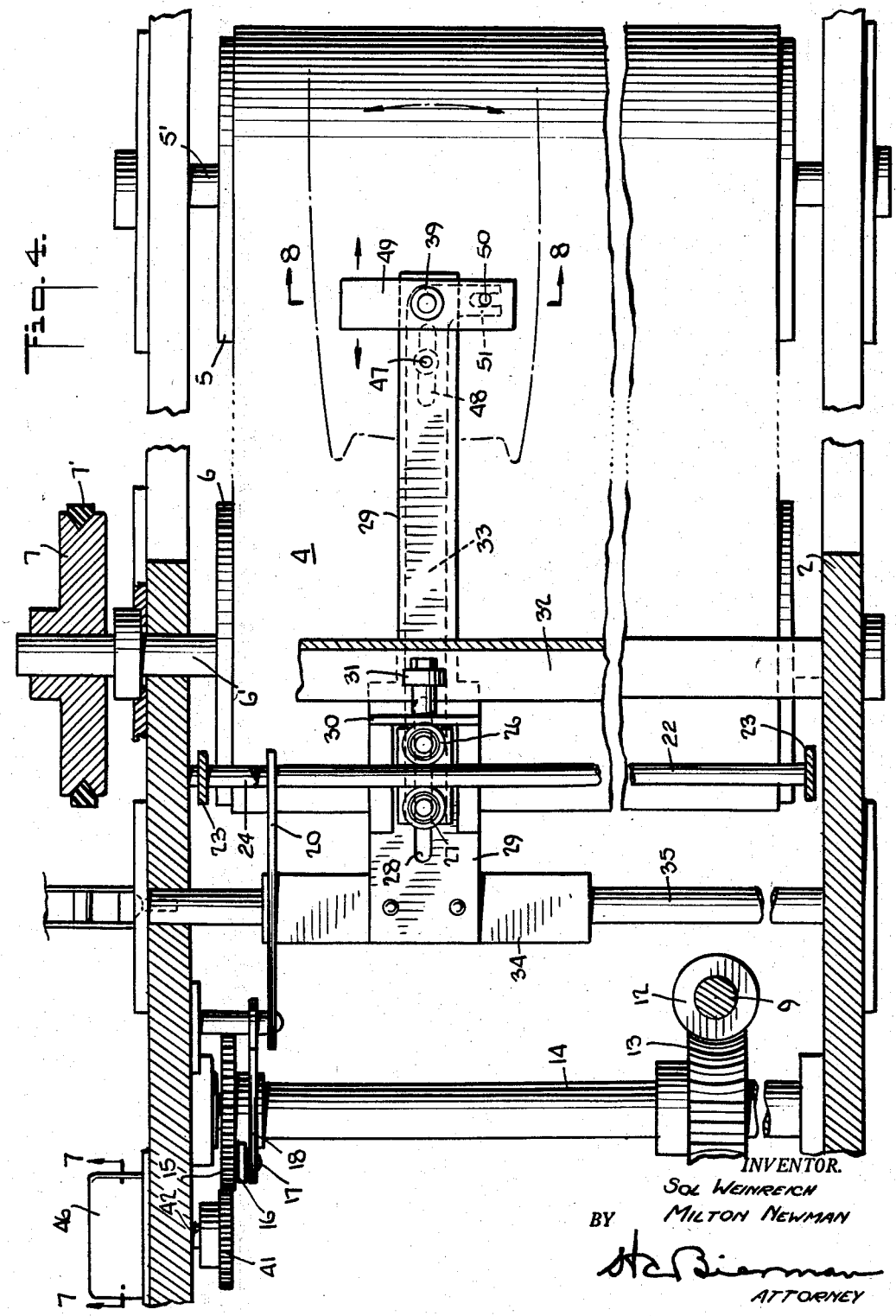

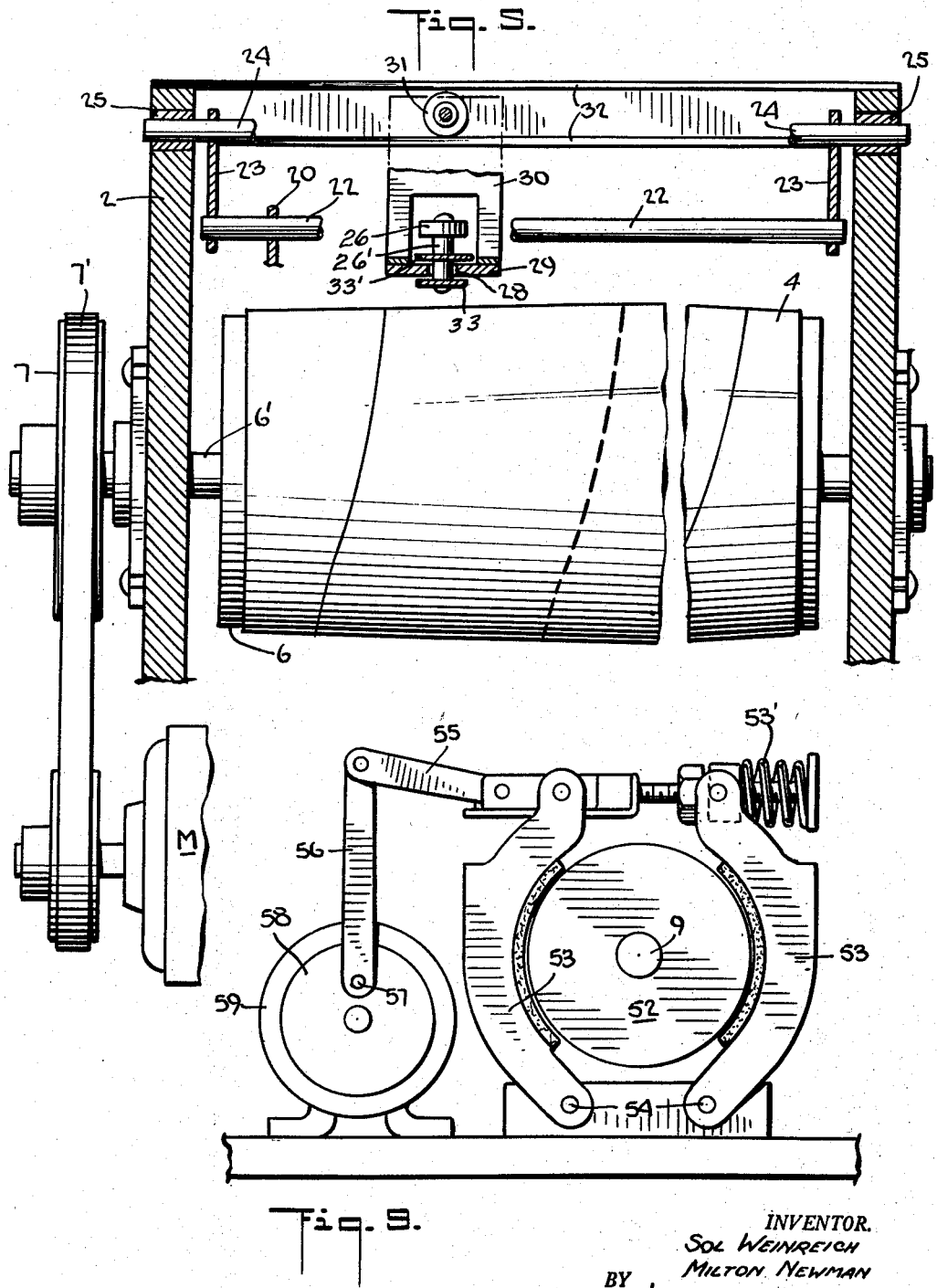

United States Patent Office 2,908,087
Patented Oct. 13, 1959

2,908,087

CAR CONTROL DEMONSTRATOR

Sol Weinreich, Rockville Centre, and Milton Newman, New York, N.Y.

Application December 9, 1955, Serial No. 552,097

5 Claims. (Cl. 35—11)

The present invention is directed to a car control apparatus and more particularly to a compact arrangement embodying a miniature motor car for the purpose of enabling an operator to test his skill in driving, and for other purposes.

It is highly desirable to provide an apparatus of the type described for various purposes, such as for the demonstration of the skill of the operator to manipulate a car on the road. Such an apparatus would be of miniature size and includes a simulated road with a car on the road. The operator manipulates a steering wheel mounted in front of the road and steers the car according to changing conditions on the road. Such an apparatus is also desirable for the purpose of demonstrating the ease of driving when power steering is incorporated in the car, compared to the more difficult steering with a conventional steering arrangement. In addition thereto it is also desirable to provide such an apparatus which would attract a potential customer to utilize the apparatus and thus advertise the make of car. The apparatus is capable of teaching a beginner to drive a car under road conditions.

In view of the above, it is among the objects of the present invention to provide an apparatus of the type described, which is simple in construction, which is sturdy and which is readily manipulated by even an inexperienced operator.

It is also among the objects of the present invention to provide an apparatus in which there is a periodic change of conditions such that the operator is informed that power steering or conventional steering is in operative position.

It is further among the objects of the present invention to provide an apparatus in which a simulated road moves towards the operator and a miniature car appears to move away from the operator so that the operator feels that he is within the car and is operating it.

In practicing the present invention, there is provided a belt mounted in a body, the belt being substantially horizontal and above said belt a miniature car is held. In front of the belt is a steering wheel connected to the car in such a manner that upon its being operated, the car will move transversely of the apparatus and of the movement of the belt. There is a further connection between the steering wheel and the car such that an oscillating movement of the car is obtained under certain conditions. As a result, the operator can move the car laterally in a twisting movement in his attempts to keep the car on the road and traveling in a legal manner.

In the accompanying drawings constituting a part hereof and in which like reference characters indicate like parts:

Fig. 1 is a side elevational view of an apparatus made in accordance with the present invention, some parts being broken away and some parts being shown in section;

Fig. 2 is a top plan view thereof;

Fig. 3 is an enlarged longitudinal cross-sectional view of the apparatus shown in Fig. 1, some parts being shown in elevation;

Fig. 4 is a top plan view thereof with the body removed;

Fig. 5 is a transverse vertical cross-sectional view taken along line 5—5 of Fig. 3;

Fig. 6 is a transverse, vertical, cross-sectional view taken along line 6—6 of Fig. 3;

Fig. 7 is a view of an arrangement of microswitches and taken along line 7—7 of Fig. 4;

Fig. 8 is a transverse cross-sectional view taken along line 8—8 of Fig. 4;

Fig. 9 is a bottom view of the steering post, showing the brake arrangement, and Figs. 10A and 10B are wiring diagrams of the operation.

On base 1 is mounted a hollow support 2 having a window 3 in the top thereof to render endless belt 4 visible to the operator. Said belt is mounted for rotation on rollers 5 and 6 on shafts 5' and 6', respectively. Pulley 7 fixed on shaft 6' has belt 7' connected to driving motor M. The surface of belt 4 simulates a road. Steering wheel 8 at the front of said belt is secured to the top of steering post 9, which is held between bearings 10 and 11, at the top and bottom, respectively. A worm 12 on post 9 meshes with gear 13 on shaft 14 which carries gear 15.

A link 16 is mounted on gear 15 and is linked at 17 to bell crank lever 18 pivoted at 19 to base 19' fixed on support 2. Link 20 is pivoted to lever 18 at 21, the other end of link 20 being mounted on rod 22. Brackets 23 at the ends of rod 22 are mounted for oscillation on shaft 24 in bearing 25. Rod 22 is held between rollers 26 and 27, the lower ends of which pass through slot 28 of horizontal elongated plate extension 29. Support 30, the lower end of which is secured to plate 29, has roller 31 at the upper end operating in transverse channel or track 32 for lateral movement. Plate 29 is guided between plate 33' and elongated plate 33. Pins 26' and 27' of rollers 26 and 27, respectively, are fixed in the front end of plate 33.

The front of plate 29 is secured on carriage 34 mounted on shaft 35 for lateral movement. Angles 36 are attached to the adjacent ends of chain 37 operating on sprockets 38. One of said sprockets is rotated by a carriage motor 38', which in turn is operated through a rheostat 46. Pin 39 attached to the rear end of plate 29, is held in bearing 39' fixed in anchor plate 49 on car 40 which is held just above belt 4.

Overdrive gear 41 mounted on shaft 42 is adapted to control the speed of the carriage 34 for movement of the car from side to side. Referring to Fig. 7, sector 43 is secured on shaft 42 and, in the oscillating movement of said shaft by means of intermeshing gears 41 and 15, alternately contacts the microswitches 44 and 45, thereby governing the movements of carriage 34 by reversing the rotation of the carriage motor. A rheostat 46 is carried by shaft 42 and is in circuit with the carriage motor, thus controlling the speed of said motor; the farther the steering wheel 8 is turned to the right or left the faster is the rotation of said motor.

A set screw 47 passing through longitudinal slot 48 in the rear end of plate 33 is held in plate 29. Anchor plate 49 secured to the body of car 40, has a depending pin 50 which engages in open ended slot 51 in a lateral extension of plate 33. Thereby on longitudinal sliding of plate 33, there is imparted a twisting movement of car 40 about pin 39 by the action of pin 50.

A braking arrangement is provided at the lower end of the steering post 9. It includes a cylindrical block 52 secured to post 9. A pair of brake arms 53 pivoted at 54 embrace the block and engage it by the action of spring 53'. Link 55 is connected to link 56 which, in turn is pivoted at 57 off-center on disc 58 of motor 59. A timer (not shown) is connected to the circuit of motor 59, to automatically at predetermined intervals, cause brake arms to alternately engage and disengage block 52, thereby periodically simulating conventional and power steering of the car.

In the operation of the apparatus the operator stands in front of steering wheel 8 of Fig. 1 and looks through the transparent window 3, seeing the car 40 on belt 4, as shown in Fig. 2. He presses a push button momentarily, which starts the various circuits. Usually there is provided a sound apparatus, such as a sound tape, a sound record or the like, which is started when the circuit is closed, and gives instructions or advice or other information to the operator. Simultaneously the closed circuit starts a flasher control which automatically cuts off the electrical apparatus after one complete cycle has been made. Shortly after the flasher starts, the belt motor M begins to function, causing belt 4 to move in the direction of the operator. At the same time the sound message repeater is energized. The operator moves steering wheel 8 in accordance with road conditions, such movement causing link 16, crank lever 18 and link 20 to move, shifting brackets 23 forward or backward. This causes longitudinal plate 33 to move forward or backward as the case may be, moving pin 50 similarly and causing car 40 to oscillate about pin 39 as a pivot. To correct this movement, the operator may reverse the oscillation of the steering wheel, which may cause the car to oscillate towards the centerline or even beyond. Also, the movement of the steering wheel causes movement of shaft 42 connected to rheostat 46, whereby carriage motor 38' operates to the right or the left, depending upon which of microswitches 44 and 45 is in the circuit. This causes transverse shifting of carriage 34, causing similar shifting of plate 29 and resulting in lateral shifting of car 40.

After a predetermined time during the cycle, brake motor 59 is energized at such a moment as to synchronize with the sound, which at said moment announces the change-over from conventional to power steering or vice versa. The brake motor in switching to power steering, will move the brake so that the shoes 53 are out of contact with block or drum 52. This eases the effort of the operator in steering. Then after a predetermined time the brake motor makes the return cycle, again in synchronism with the sound and the brake shoes grip the drum to make steering more difficult. When the message and the cycle is finished, the flasher control automatically shuts off the entire apparatus. There are provided two lights, each having a legend, one stating "conventional" and the other stating "power." These lights are synchronized with the brake action so that the operator can see which type of steering is in operation.

As the steering wheel is turned in one direction from the neutral or centerline position, the car twists in the same direction and the carriage motor moves the car laterally in that direction. The speed of the lateral movement and the angle of the twist are controlled by the amount that the wheel is turned and the greater the amount of turn, the higher will be the lateral speed of the car and the angle of twist. The speed of the lateral movement and the angle of twist remains constant in relation to each other, within the limits of the mechanism, until the steering wheel has been turned to speed, slow, or stop movement, at the same time twisting the car to coincide with the movement. The friction drive on the carriage motor permits it to run and not to stall even after the car has reached the limit of lateral movement and the steering wheel has not been centered or reversed. The friction drive on said motor allows slippage which permits this function.

Referring to Fig. 10A, cam 43 permits only one of the two microswitches 44 and 45 to be in closed position at any time. In the center position both switches are open. Cam 43 and variable resistance 46 are operated directly from steering wheel 8. In Fig. 10B the circuit for operating the brake is shown. Switch 60 may be manually or automatically operated, as by a timer, to throw the device into power or conventional steering by releasing or applying brake shoes 53 through brake motor 59. The circuit includes single pole double throw microswitch 61 and also a pair of lamps 62 and 63. These lamps are lit alternately to indicate whether power or coventional steering is in operation.

What is claimed is:

1. A car model control apparatus comprising a stationary body, a steering wheel, a post mounted for oscillation in said body and carrying said wheel, an endless belt simulating a road mounted substantially horizontally in said body and in view of the operator of said wheel, a car model mounted above said belt but adjacent thereto, a carriage adapted to move transversely of said belt and mounted in said body, a link from said carriage to said car model, a laterally movable mount for said carriage, a motor connected to said mount, a pair of switches operatively connected to said steering wheel for actuating said motor alternately in opposite directions, whereby lateral movement of said carriage and said car model is obtained, a longitudinally movable plate held in said body, a pivot for said car, an anchor secured to said car and a link connection from said anchor to said longitudinal plate to impart twisting movement of said car about said car pivot, and a motor for driving said belt.

2. A car model control apparatus comprising a stationary body, a steering wheel, a post mounted for oscillation in said body and carrying said wheel, an endless belt simulating a road mounted substantially horizontally in said body and in view of the operator of said wheel, a car model mounted above said belt but adjacent thereto, a carriage adapted to move transversely of said belt and mounted in said body, a link from said carriage to said car model, a laterally movable mount for said carriage, a motor connected to said mount, a pair of switches operatively connected to said steering wheel for actuating said motor alternately in opposite directions, whereby lateral movement of said carriage and said car model is obtained, a longitudinally movable plate held in said body, a pivot for said car, an anchor secured to said car and a link connection from said anchor to said longitudinal plate to impart twisting movement of said car about said car pivot, and a motor for driving said belt, a brake attached to said post, means electrically connected to said brake and adapted to operate said brake at a predetermined time.

3. A car model control apparatus comprising a stationary body, a steering wheel, a post mounted for oscillation in said body and carrying said wheel, an endless belt simulating a road mounted substantially horizontally in said body and in view of the operator of said wheel, a car model mounted above said belt but adjacent thereto, a carriage adapted to move transversely of said belt and mounted in said body, a link from said carriage to said car model, a laterally movable mount for said carriage, a motor connected to said mount, a pair of switches operatively connected to said steering wheel for actuating said motor alternately in opposite directions, whereby lateral movement of said carriage and said car model is obtained, a longitudinally movable plate held in said body, a pivot for said car, an anchor secured to said car and a link connection from said anchor to said longitudinal plate to impart twisting movement of said car about said car pivot, and a motor for driving said belt, a rheostat connected to said carriage motor to vary the speed of lateral movement of said carriage.

4. A car model control apparatus comprising a stationary body, a steering wheel, a post mounted for oscillation in said body and carrying said wheel, an endless belt simulating a road mounted substantially horizontally in said body and in view of the operator of said wheel, a car model mounted above said belt but adjacent thereto, a carriage adapted to move transversely of said belt and mounted in said body, a link from said carriage to said car model, a laterally movable mount for said carriage, a motor connected to said mount, a pair of switches operatively connected to said steering wheel for actuating said motor alternately in opposite directions, whereby lateral movement of said carriage and said car model is obtained, a longitudinally movable plate held in said body, a pivot for said car, an anchor secured to said car and a link connection from said anchor to said longitudinal plate to impart twisting movement of said car about said car pivot, and a motor for driving said belt, a connection between said wheel and said longitudinal plate including a transverse rod, a link embracing said transverse rod, rollers on opposite side of said transverse rod, pins for said rollers attached to the front of said longitudinal plate.

5. A car model control apparatus comprising a stationary body, a steering wheel, a post mounted for oscillation in said body and carrying said wheel, an endless belt simulating a road mounted substantially horizontally in said body and in view of the operator of said wheel, a car model mounted above said belt but adjacent thereto, a carriage adapted to move transversely of said belt and mounted in said body, a link from said carriage to said car model, a laterally movable mount for said carriage, a motor connected to said mount, a pair of switches operatively connected to said steering wheel for actuating said motor alternately in opposite directions, whereby lateral movement of said carriage and said car model is obtained, a longitudinally movable plate held in said body, a pivot for said car, an anchor secured to said car and a link connection from said anchor to said longitudinal plate to impart twisting movement of said car about said car pivot, and a motor for driving said belt, a connection between said wheel and said longitudinal plate including a transverse rod, a link embracing said transverse rod, rollers on opposite side of said transverse rod, pins for said rollers attached to the front of said longitudinal plate, a pair of brackets the lower ends of which are mounted for oscillation and the lower ends held by said rod.

References Cited in the file of this patent

UNITED STATES PATENTS

| | | |
|---|---|---|
| 2,341,312 | Chedister | Feb. 8, 1944 |
| 2,460,743 | Germanton | Feb. 1, 1949 |
| 2,697,883 | Pellaton | Dec. 28, 1954 |
| 2,742,714 | Allgaier | Apr. 24, 1956 |

FOREIGN PATENTS

| | | |
|---|---|---|
| 714,921 | Great Britain | Sept. 8, 1954 |